United States Patent
Vogt et al.

(10) Patent No.: US 6,812,658 B2
(45) Date of Patent: Nov. 2, 2004

(54) DRIVE UNIT

(75) Inventors: Richard Vogt, Willstaett (DE); Jochen Goehre, Karlsruhe (DE); Thomas Helming, Baden-Baden (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/312,548

(22) PCT Filed: Mar. 23, 2002

(86) PCT No.: PCT/DE02/01083
§ 371 (c)(1),
(2), (4) Date: Dec. 31, 2002

(87) PCT Pub. No.: WO02/091560
PCT Pub. Date: Nov. 14, 2002

(65) Prior Publication Data
US 2003/0091344 A1 May 15, 2003

(30) Foreign Application Priority Data
May 4, 2001 (DE) .......... 101 21 766

(51) Int. Cl.⁷ .............. H02K 29/00
(52) U.S. Cl. .......... 318/138; 318/254; 318/435; 388/825
(58) Field of Search .......... 388/825, 815, 388/809, 805, 818; 318/138, 254, 239, 139

(56) References Cited

U.S. PATENT DOCUMENTS

| | | | | |
|---|---|---|---|---|
| 4,922,161 A | * | 5/1990 | Gilliland et al. .......... | 318/269 |
| 5,204,547 A | * | 4/1993 | Schumacher et al. ...... | 307/10.1 |
| 5,262,703 A | * | 11/1993 | Schmider et al. .......... | 318/138 |
| 5,408,694 A | * | 4/1995 | Tran .......... | 455/212 |
| 5,486,957 A | * | 1/1996 | Albrecht .......... | 360/75 |
| 5,659,233 A | * | 8/1997 | Nashiki .......... | 318/440 |
| 5,867,002 A | | 2/1999 | Dauvergne | |
| 6,351,601 B1 | * | 2/2002 | Judkins, III .......... | 388/815 |
| 6,373,673 B1 | * | 4/2002 | Anthony .......... | 361/117 |
| 6,483,370 B1 | * | 11/2002 | Bienvenu et al. .......... | 327/442 |
| 6,483,377 B2 | * | 11/2002 | White et al. .......... | 327/536 |

FOREIGN PATENT DOCUMENTS

| | | |
|---|---|---|
| DE | 197 56 461 A1 | 7/1999 |
| DE | 199 50 147 A | 4/2000 |
| GB | 2 081 879 A | 2/1982 |

OTHER PUBLICATIONS

Patent Abstracts Of Japan vol. 1998, No. 09, Jul. 31, 1998 & JP 10 086629 A, Apr. 7, 1988.

* cited by examiner

Primary Examiner—Karen Masih
(74) Attorney, Agent, or Firm—Michael J. Striker

(57) ABSTRACT

A drive unit, in particular for a fan in motor vehicles, is indicated, comprising an electric motor (12) operated on a DC line ($U_{Bat}$), and comprising a device (13) for controlling the speed of the motor (12) by changing the operating voltage applied at the motor (12). In order to cost-effectively realize a stepwise adjustment of the motor speed, the speed control device (13) comprises a plurality of resistors (R1–R3) and a plurality of semiconductor switches (T1—T3) for selectively connecting the motor (12) in series with at least one of the resistors (R1–R3)

6 Claims, 1 Drawing Sheet

DRIVE UNIT

BACKGROUND OF THE INVENTION

The Invention is based on a drive unit, in particular for a fan in motor vehicles.

Such drive units are used in motor vehicles as fan motors to air condition or heat the passenger compartment, and to cool the coolant of the internal combustion engine. In the case of air-conditioning or heater fans, it is known, for example, that a step switch can be used to select various fan levels at which the DC motor connected to the vehicle's 12-volt electrical system is set at different speeds. In the case of air-conditioner fans for the coolant of the internal combustion engine, it is known that the speed of the DC motor driving the fan for the radiator can be adjusted using an electrical control unit as a function of engine management data.

A known control unit for controlling a DC motor (DE 197 56 461 A1) comprises a semiconductor switch developed as MOSFET that is connected in series with the DC motor, and the control electrode of which is acted upon by a pulse width modulated control signal. The DC motor is therefore provided—by means of the semiconductor switch—with a mean voltage, the level of which depends on the modulation depth of the control signal. The speed of the DC motor decreases as the mean voltage decreases. The control signal is generated as a function of a setpoint value-actual value comparison of the power of the DC motor. It is also possible to generate the control signal from a set speed that is specified manually, for example, and eliminate a speed closed control loop.

SUMMARY OF THE INVENTION

The drive unit according to the invention has the advantage that a stepwise adjustment of the speed of the motor can be realized in very a cost-effective fashion. Since the semiconductor switch is not operated in cyclical fashion as with the known control unit, but is instead operated in such a fashion that one semiconductor switch at a time is fully connected, and the remaining semiconductor switches are fully blocked, the electromagnetic compatibility (EMC) of the drive unit is not critical. When low-resistance semiconductor switches are used, the only power losses that occur in them are negligibly small, so that large-volume heat sinks can be eliminated. The device for controlling speed is compact and is capable of being integrated in a connector of the drive unit according to an advantageous embodiment of the invention, for example.

According to an advantageous exemplary embodiment of the invention, for n+1 speed levels, the device comprises n series circuits, each having one resistor and one semiconductor switch, as well as a further semiconductor switch connected in series with the motor to the DC power supply. Each of the n series circuits is connected in parallel with the semiconductor switch of the series circuit for the subsequent speed level, and the last series circuit is connected in parallel with the further semiconductor switch. Resistors having identical ratings can be used for speed levels that differ by identical amounts in terms of speed, and the semiconductor switches can be dimensioned differently in accordance with their different current loads in order to make use of cost advantages. When the further semiconductor switch is closed, the maximum speed is set.

According to an alternative exemplary embodiment of the invention, for n+1 speed levels, the device has n series circuits, each comprising one resistor and one semiconductor switch, and one further semiconductor switch connected in series with the motor to the DC power supply, whereby the n series circuits are connected in parallel with each other and with the further semiconductor switch. The resistors are to be rated differently in accordance with the selected speed level. In this case as well, however, the semiconductor switches can be dimensioned differently due to the fact that their current load decreases as the speed decreases. When the further semiconductor switch is closed, the maximum speed is set.

BRIEF DESCRIPTION OF THE DRAWINGS

The invention is described in greater detail in the following description with reference to the exemplary embodiments presented in the drawings.

DETAILED DESCRIPTION OF THE PREFERRED EMBODIMENTS

Figure 1:
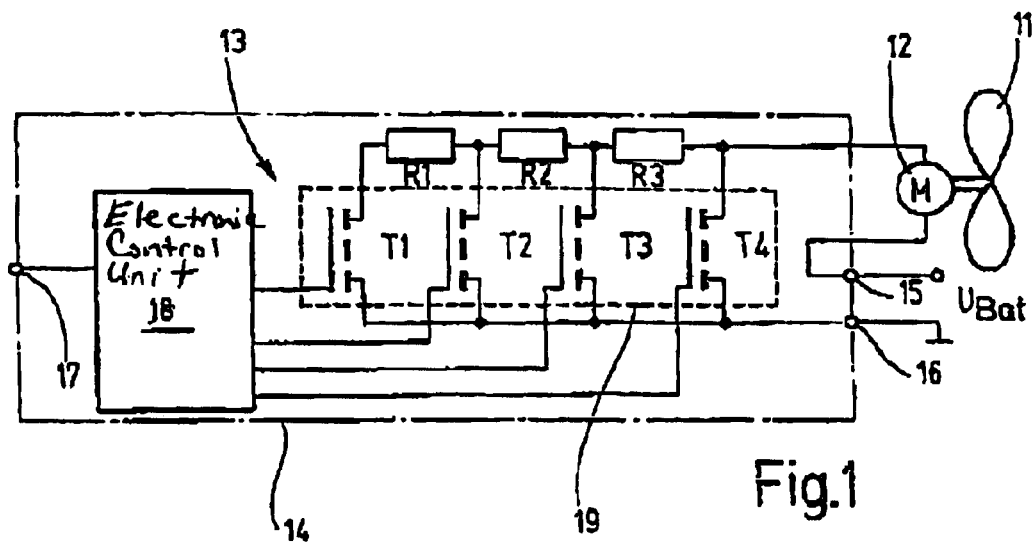
FIG. 1 shows a circuit diagram of a fan that can be operated at four fan levels.

The fan shown in the circuit diagram in FIG. 1 is intended for use in motor vehicles and is operated on the 12-volt DC power supply of the motor vehicle. It has a blower or fan wheel 11 that is coupled with a drive unit. The fan can be operated at four fan levels having different speeds, for the purpose of which the drive unit comprises an electric motor 12 developed as a DC motor and driving the fan wheel 11, as well as a device for controlling the speed of the motor 12, referred to hereinbelow as the speed control device 13.

As illustrated schematically in FIG. 1, the speed control device 13 is integrated in a connector 14 of the drive unit or the fan, which said connector comprises two plug contacts 15, 16 for connection to the DC power supply $U_{Bat}$ of the motor vehicle, and one plug contact 17 for inputting a data signal for the fan level setting.

The speed control device 13 comprises a plurality of resistors R1–R3 and a plurality of semiconductor switches in the form of power transistors T1–T3, which are developed as low-side-power MOSFET switches in this case. For the four fan or speed levels realized in the exemplary embodiment, the speed control device 13 comprises three series circuits, each having one resistor R1–R3 and one transistor T1–T3, as well as a further transistor T4 developed as a power MOSFET switch. Each of the three series circuits is connected in parallel with the transistor of the series circuit for the subsequent speed level. The series circuit comprising resistor R1 and transistor T1 is therefore connected in parallel with transistor T2, and the series circuit comprising resistor R2 and transistor T2 is connected in parallel with transistor T3. The last series circuit comprising resistor R3 and transistor T3 is connected in parallel with the further transistor T4, which is connected in series with the motor 12 to the DC power supply $U_{Bat}$. If n+1 speed levels are provided, n series circuits each comprising one resistor R and one transistor T are available, whereby—as described—each of the n series circuits is connected in parallel with the transistor of the series circuit for the subsequent speed level, and the last series circuit comprising resistor and transistor is connected in parallel with the further transistor T which—as described—is connected in series with the motor 12 to the DC power supply $U_{Bat}$. The control electrodes of the transistors T1–T4—their gates in the case of MOSFETs—are connected to an electronic control unit 18 with its input situated at the plug contact 17, which said electronic control unit actuates the transistors T1–T4 in selectively conductive fashion. Only one of the transistors T1–T4 is fully connected at a time, while the remaining ones are blocked. In accordance with the data signal provided at the input of the electronic control unit 18 via the plug contact 17, the electronic control unit 18 generates a switch-point signal for one of the transistors T1–T4 that causes the transistor to become connected; said switch-point signal is applied until the data signal is changed. To switch on the lowest fan level, at which the motor 12 runs at the lowest speed, the switch-point signal is applied to transistor T1. The operating voltage applied to the motor 12 is reduced by the amount of the voltage drop produced by the resistors R1–R3 as compared with the DC power supply $U_{Bat}$. As a result, the speed is reduced by a maximum amount as compared with the nominal speed of the motor 12. At the highest fan level with the maximum speed of the motor 12, the control signal is forwarded to the further transistor T4. The motor 12 is connected to the DC power supply $U_{Bat}$ and runs at nominal speed. Each of the remaining transistors is kept blocked.

The power loss ocurring in the individual transistors T1–T4 depends on the forward DC resistance of the transistors $R_{DS(on)}$ and the motor current 1, and equals $I^2 \cdot R_{DS(on)}$ in each case. This power loss can be kept low if low-resistance transistors T1–T4 are used. Additionally, cost advantages can be achieved by dimensioning the transistors T1–T4 differently in accordance with their different loads, whereby the lowest load is applied to transistor T1, and the highest load is applied to transistor T4. Due to the minimal power loss of transistors T1–T4, the cooling surfaces required for transistors T1–T4 can be kept relatively small, and all transistors T1–T4 can be combined on one common heat sink 19, which is indicated using dashed lines in FIG. 1.

Figure 2:
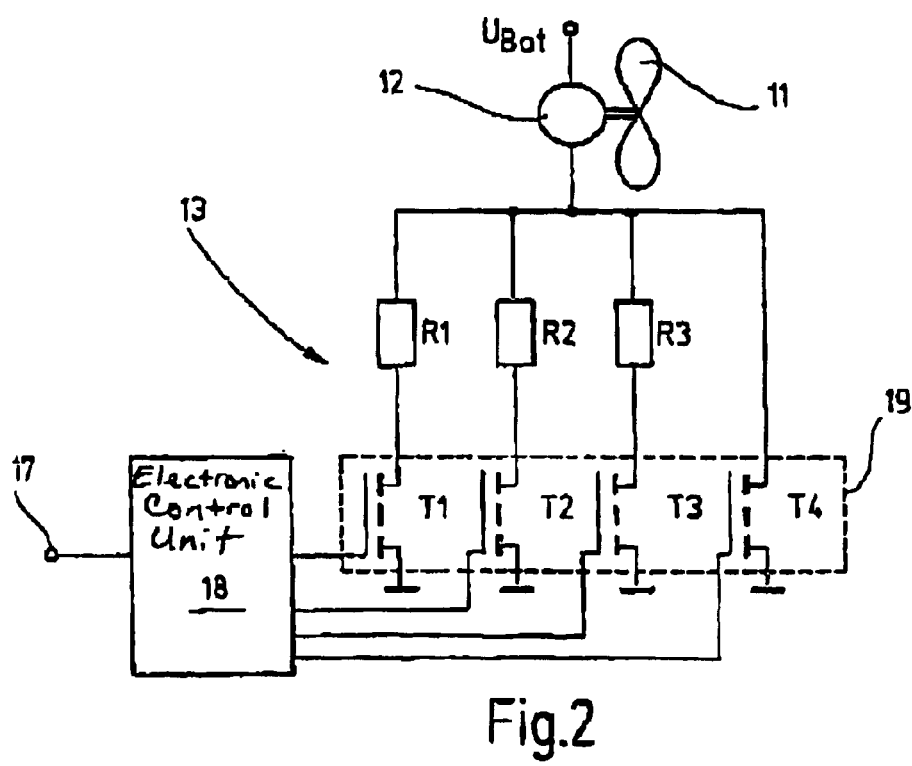
FIG. 2 shows the same representation of the fan in FIG. 1 according to a further exemplary embodiment.

The speed control device 13 shown in the circuit diagram in FIG. 2 for the motor 12 driving the fan wheel 11 is modified to the extent that all three series circuits, each comprising one resistor R1–R3 and one transistor T1–T3, are connected in parallel with each other and with the further transistor T4, which, in turn, is connected in series with the motor 12 to the DC power supply $U_{Bat}$. The mode of operation of the speed control device 13 is unchanged. For identical speed gradations, it is only necessary to dimension the resistors R1–R3 differently. While resistors R1–R3 can have identical ratings for identical speed intervals between the individual speed levels in the case of the speed control device 13 according to FIG. 1, the resistors must be multiplied in this case as the speed levels become slower. Advantageously, however, further speed levels can be obtained by simultaneously triggering a plurality of transistors T1–T3, e.g., T1 and T3 or T1 and T2, or T2 and T3.

What is claimed is:

1. A drive unit, in particular for a fain in motor vehicles, comprising an electric motor (12) operated on a DC line, and comprising a device (13) for controlling the speed of the motor (12) by changing the operating voltage applied at the motor (12), wherein the device (13) comprises a plurality of resistors, R1–R3, and a plurality of semiconductor switches, T1–T3, selectively connecting the motor (12) in series with at least one of the resistors, R1–R3, wherein for n+1 speed levels, the device (13) comprises n series circuits each having one resistor, R1–R3, and one semiconductor switch, T1–T3, and having one further semiconductor switch, T4, connected in series with the motor (12) to the DC line, $U_{Bat}$, and wherein each of the n series circuits is connected in parallel with the semiconductor switch, T1–T3, of the series circuit for the subsequent speed level, and the last series circuit is connected in parallel with the further semiconductor switch, T4.

2. The drive unit according to claim 1, wherein, for n+1 speed levels, the device (13) comprises n series circuits each having one resistor, R1–R3, and one semiconductor switch, T1–T3, and having one further semiconductor switch, T4, connected in series with the motor (12) to the DC line, $U_{Bat}$, and wherein the n series circuits are connected in parallel with each other and with the further semiconductor switch, T4.

3. The drive unit according to claim 1, wherein the semiconductor switches, T1–T4, are developed as low-resistance power switches.

4. The drive unit according to claim 1, wherein the control electrodes o the semiconductor switches, T1–T4, are connected to an electronic control unit (18) that has an input (17) for forwarding data signals.

5. The drive unit according to claim 3, wherein low-side power MOSFET switches are used as semiconductor switches, T1–T4.

6. The drive unit according to claim 1, wherein the device (13) for controlling the speed is integrated in a connector (14).

* * * * *